United States Patent
Pickholz et al.

(10) Patent No.: US 8,166,330 B2
(45) Date of Patent: Apr. 24, 2012

(54) CONTROLLING AUXILIARY POWER TO LOGIC DEVICES

(75) Inventors: Arik Pickholz, Even Yehuda (IL); Shay Mizrachi, Hod HaSharon (IL)

(73) Assignee: Broadcom Corporation, Irvine, CA (US)

( * ) Notice: Subject to any disclaimer, the term of this patent is extended or adjusted under 35 U.S.C. 154(b) by 1155 days.

(21) Appl. No.: 11/951,759

(22) Filed: Dec. 6, 2007

(65) Prior Publication Data

US 2009/0150702 A1    Jun. 11, 2009

(51) Int. Cl.
*G06F 1/26* (2006.01)
(52) U.S. Cl. ............... 713/330; 710/16; 713/324
(58) Field of Classification Search .......... 713/330, 713/324; 710/16
See application file for complete search history.

(56) References Cited

U.S. PATENT DOCUMENTS

| 6,393,570 | B1 * | 5/2002 | Henderson et al. ........... 713/310 |
| 6,560,713 | B1 * | 5/2003 | Chary .......................... 713/340 |
| 6,968,470 | B2 * | 11/2005 | Larson et al. ................. 713/340 |

OTHER PUBLICATIONS

Wake on LAN Technology, White Paper, Rev 2, Lieberman Software Corporation, Jun. 1, 2006, 9 pages.

* cited by examiner

*Primary Examiner* — Albert Wang
(74) *Attorney, Agent, or Firm* — Brake Hughes Bellermann LLP (57) ABSTRACT

Various example implementations are disclosed. According to one example implementation, a system may include multiple logic devices, a power input, and a logic controller. The logic devices may each be configured to assert a request for auxiliary power to a logic controller. The power input may be configured to provide the auxiliary power to one or more of the logic devices. The logic controller may be configured to poll the logic devices by polling less than all of the logic devices at a time to determine whether the logic devices assert the request for the auxiliary power.

19 Claims, 4 Drawing Sheets

CONTROLLING AUXILIARY POWER TO LOGIC DEVICES

TECHNICAL FIELD

This description relates to power control.

BACKGROUND

Systems may not have their primary power source available, and may rely on an auxiliary power source. The auxiliary power source may not be sufficient to power all of the devices in the system.

SUMMARY

According to one general aspect, a system may include multiple logic devices, a power input, and a logic controller. The logic devices may each be configured to assert a request for auxiliary power to a logic controller. The power input may be configured to provide the auxiliary power to one or more of the logic devices. The logic controller may be configured to poll the logic devices by polling less than all of the logic devices at a time to determine whether the logic devices assert the request for the auxiliary power.

According to another general aspect, a system may include multiple logic devices, a power input, and a logic controller. The power input may be configured to provide an auxiliary power input to the logic devices. The logic controller may be configured to select a group of the logic devices for disabling the auxiliary power based, at least in part, on a priority level of each of the logic devices, and to disable the auxiliary power to the selected group of logic devices.

According to another general aspect, a process may include determining that a power input is transitioning from no power to auxiliary power. The process may further include polling multiple logic devices one at a time to determine whether the logic devices assert a request for auxiliary power in response to determining that the power input is transitioning from no power to auxiliary power.

According to another general aspect, a process may include determining that a power input is transitioning from a primary power to either an auxiliary power or not power. The process may further include fast parallel detection of multiple logic devices asserting a signal for requesting auxiliary power to determine whether the logic device or devices has priority over other logic device(s) so their power input is configured for auxiliary power.

The details of one or more implementations are set forth in the accompanying drawings and the description below. Other features will be apparent from the description and drawings, and from the claims.

DETAILED DESCRIPTION

Logic devices, such as chips or microchips, electronic devices, and/or circuit boards, may need to perform functions under limited power conditions. For example, a system with multiple logic devices may have limited power which is not sufficient to enable all of the multiple logic devices to operate at the same time. However, the power may be sufficient to enable one or more, but less than all, of the multiple logic devices to perform functions at a given time.

Figure 1A:
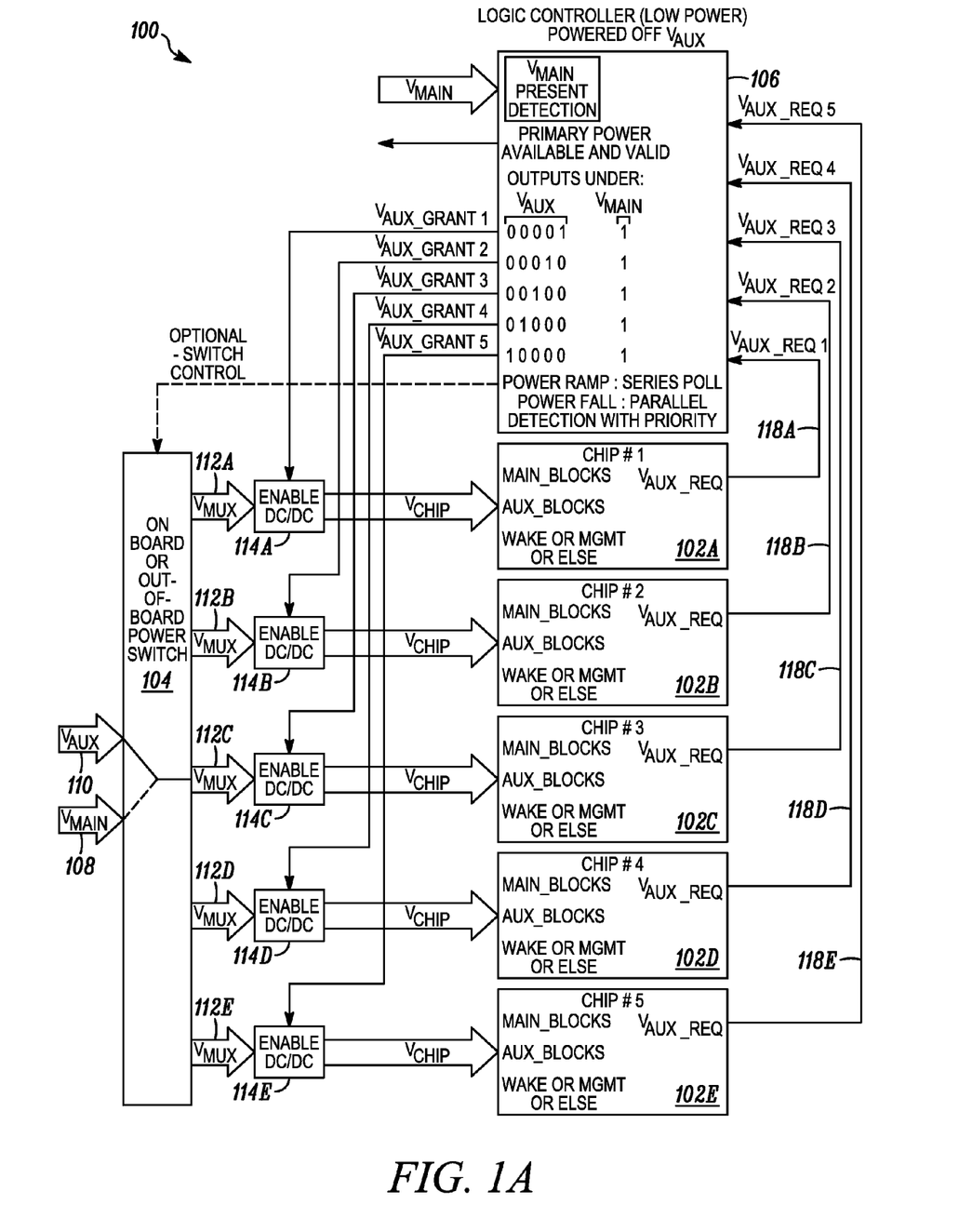
FIGS. 1A and FIG. 1B are diagrams of a system including multiple logic devices, a power input, and a logic controller for determining which of the logic devices may receive auxiliary power from the power input, according to an example implementation.
Figure 1B:
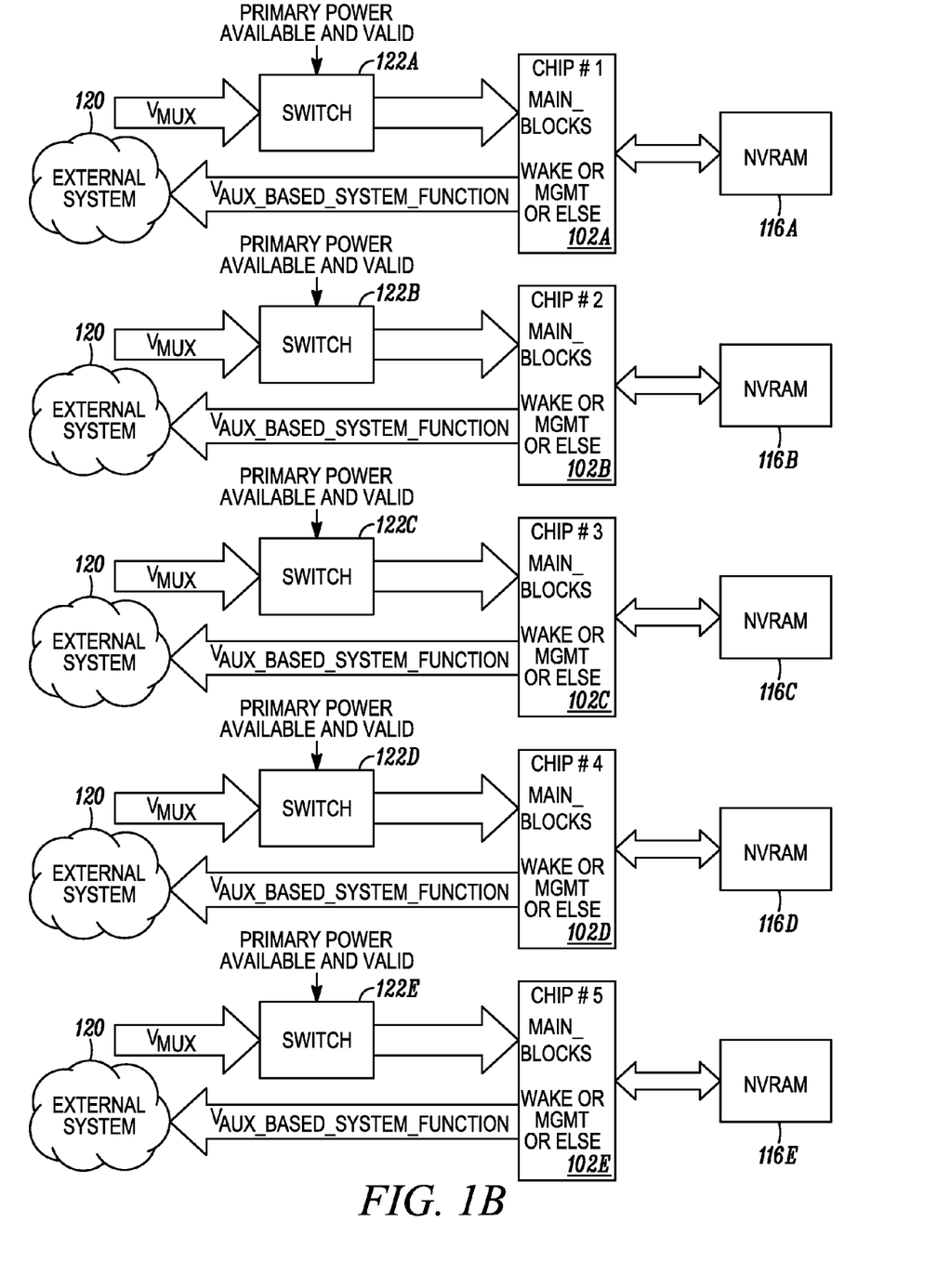

FIGS. 1A and FIG. 1B are diagrams of a system 100 including multiple logic devices 102A, 102B, 102C, 102D, 102E, a power input 104, and a logic controller 106 for determining which of the logic devices 102A, 102B, 102C, 102D, 102E may receive auxiliary power from the power input 104, according to an example implementation.

The system 100 may, for example, include a circuit board such as a server or blade server. The logic devices 102A, 102B, 102C, 102D, 102E may include chips, electronic devices, or circuit boards, which may include routers or switches, such as Ethernet controllers, Gigabit Ethernet controllers, or ten Gigabit Ethernet controllers, according to example implementations.

The logic devices 102A, 102B, 102C, 102D, 102E may receive power from the power input 104. The power input 104 may, according to an example implementation, have two or more power sources, such as a main power 108 and an auxiliary power 110. The power input 104 may include a power switch, and may switch between the main power 108 and the auxiliary power 110 as the power source for powering the logic devices 102A, 102B, 102C, 102D, 102E. The logic devices 102A, 102B, 102C, 102D, 102E may detect whether they are receiving power from the main power 108 or the auxiliary power 110, according to an example implementation.

The main power 108 may, for example, be a primary power source for the system 100, and the auxiliary power 110 may be a secondary power source for the system 100. The auxiliary power 110 may, for example, provide power when the main power 108 drops or is powered down, such as by a user. Or the auxiliary power 110 may provide power when the system 100 is powered on, such as in a wake on LAN (local area network) mode, when the auxiliary power 110 may provide power to the system 100 more quickly than the main power 108. The auxiliary power 110 may include a preliminary power supply to supply minimal power to the system 100. The logic devices 102A, 102B, 102C, 102D, 102E may thereby have two power inputs, namely, the main power 108 and the auxiliary power 110, either of which may power the logic devices 102A, 102B, 102C, 102D, 102E through the power input 104, with the power switch of the power input 104 determining which of the main power 108 or auxiliary power 110 powers the logic devices 102A, 102B, 102C, 102D, 102E at any given time.

The power input 104 may switch between main power 108 and auxiliary power 110, according to an example implementation. The power input 104 may switch in response to conditions detected by the power input 104, and/or in response to input from the logic controller 106. For example, if the main power 108 falls below a threshold, such as 3 volts, the power input 104 may switch from main power 108 to auxiliary power 110, which may have a voltage level of 3.3 volts, according to an example implementation. Or, when the system 100 is powered on, the power input 104 may transition from no power to first using the auxiliary power 110, and switch to main power 108 when the main power 108 becomes available. Or, the logic controller 106 (or another component in the system 100) may instruct the power input 104 to switch between main power 108 and auxiliary power 110 based on similar conditions.

The power input 104 may provide power to the logic devices 102A, 102B, 102C, 102D, 102E, using parallel power outputs 112A, 112B, 112C, 112D, 112E, respectively. The power outputs 112A, 112B, 112C, 112D, 112E may provide the power to the logic devices 102A, 102B, 102C, 102D, 102E using enabling nodes 114A, 114B, 114C, 114E, 114E, for example. The enabling nodes 114A, 114B, 114C, 114D, 114E, which may include direct current-to-direct current (DC-to-DC) interfaces, may allow power to be transferred from the power input 104 to their respective logic devices 102A, 102B, 102C, 102D, 102E when the enabling nodes 114A, 114B, 114C, 114D, 114E are in an enabled state, and may disallow power from being transferred from the power input 104 to their respective logic devices 102A, 102B, 102C, 102D, 102E when the enabling nodes 114A, 114B, 114C, 114D, 114E are in a disabled state, according to an example implementation. The logic controller 106 may enable or disable the enabling nodes 114A, 114B, 114C, 114D, 114E, thereby enabling or disabling main power 108 and/or auxiliary power 110 to the logic devices 102A, 102B, 102C, 102D, 102E, according to an example implementation. While this example describes the logic controller 106 as enabling or disabling main power 108 and/or auxiliary power 110 to the logic devices 102A, 102B, 102C, 102D, 102E by enabling or disabling the enabling nodes 114A, 114B, 114C, 114D, 114E, the logic controller 106 may enable or disable main power 108 and/or auxiliary power 110 to the logic devices 102A, 102B, 102C, 102D, 102E by other means, according to various example implementations.

The logic devices 102A, 102B, 102C, 102D, 102E may each be coupled to or include memory components 116A, 116B, 116C, 116D, 116E, such as non-volatile random access memory devices, according to an example implementation. The logic devices 102A, 102B, 102C, 102D, 102E may, for example, store information on the memory components 116A, 116B, 116C, 116D, 116E while the logic devices 102A, 102B, 102C, 102D, 102E are receiving sufficient power from the power input 104. The logic devices 102A, 102B, 102C, 102D, 102E may thereafter power off and, after powering back on, may retrieve the stored information from the memory components 116A, 116B, 116C, 116D, 116E.

The logic controller 106 may communicate with the logic devices 102A, 102B, 102C, 102D, 102E, using, for instance, a dedicated request pin 118A, 118B, 118C, 118D, 118E. For example, the logic controller 106 may poll the logic devices 102A, 102B, 102C, 102D, 102E, using their respective dedicated request pins 118A, 118B, 118C, 118D, 118E, for requests or assertions for auxiliary power. Or, the logic devices 102A, 102B, 102C, 102D, 102E may send priority signals to the logic controller 106, using their respective dedicated request pins 118A, 118B, 118C, 118D, 118E. The logic controller 106 may allow or provide auxiliary power 110 to one or more of the logic devices 102A, 102B, 102C, 102D, 102E based on the request(s) for auxiliary power or the priority signal(s), according to example implementations. For example, the logic controller 106 may provide auxiliary power 110 to the first logic device(s) 102A, 102B, 102C, 102D, 102E which asserts a request for auxiliary power.

In an example implementation, the system 100 may transition from not having power to being powered by the auxiliary power 110. This may occur, for example, when the system is "plugged in," such as into an electrical wall power outlet, but the system has not yet been turned on, such as by pressing an "on" button. In this scenario it may be desirable for one or more of the logic devices 102A, 102B, 102C, 102D, 102E to have some limited functionality. For example, the one or more logic devices 102A, 102B, 102C, 102D, 102E may engage in a "Wake-on LAN" (WoL) process, perform management functions such as measuring temperature or temperature changes in the system 100, and/or may interact with an external system 120 using auxiliary power-based system functions. The logic devices 102A, 102B, 102C, 102D, 102E may interact with the external system 120 via, for example, an Ethernet bus.

The logic devices' 102A, 102B, 102C, 102D, 102E respective memory components 116A, 116B, 116C, 116D, 116E may store information regarding whether each logic device 102A, 102B, 102C, 102D, 102E should request and/or use the auxiliary power 110 to engage the WoL process and/or perform the management functions. For example, upon being supplied with the auxiliary power 110, the logic devices 102A, 102B, 102C, 102D, 102E may consult their respective memory components 116A, 116B, 116C, 116D, 116E to determine whether they should assert a request for auxiliary power.

In an example implementation in which the system 100 transitions from not having power to being powered by the auxiliary power 110, the system 100 and/or its components such as the logic controller 106 may determine that the power, such as the power input 104, has transitioned from no power to auxiliary power 110, which may initiate the WoL process. In an example implementation, the auxiliary power 110 may become available before the main power 108 becomes available. The auxiliary power 110 may also become available before the main power 108 in response to the system 100 being "plugged in," such as into an AC wall outlet (not shown).

In response to the auxiliary power 110 becoming available, the logic controller 106, which may be powered by the auxiliary power 110, may poll the logic devices 102A, 102B, 102C, 102D, 102E for a request for auxiliary power. The logic controller 106 may poll the logic devices 102A, 102B, 102C, 102D, 102E to determine which logic devices 102A, 102B, 102C, 102D, 102E should be provided with the auxiliary power 110.

For example, the logic controller 106 may poll the logic devices 102A, 102B, 102C, 102D, 102E one at a time. Or, the logic controller 106 may poll another number of the 102A, 102B, 102C, 102D, 102E, such as two, three, four, etcetera, the number being less than all of the logic devices 102A, 102B, 102C, 102D, 102E at a time. The number of logic devices 102A, 102B, 102C, 102D, 102E to be polled may be predetermined, or may be based on how many logic devices 102A, 102B, 102C, 102D, 102E the auxiliary power 110 could support. For example, each of the logic devices 102A, 102B, 102C, 102D, 102E may have a threshold power level, and the logic controller 106, or another component in the system 100, may divide the power available from the auxiliary power 110 by the threshold power level to determine the number of logic devices 102A, 102B, 102C, 102D, 102E for which the auxiliary power could provide the threshold power level. The logic controller 106 may poll the determined number of logic devices 102A, 102B, 102C, 102D, 102E at a time, according to an example implementation. The logic devices 102A, 102B, 102C, 102D, 102E may or may not be polled in a predetermined sequence.

In an example implementation, the logic controller 106 may poll the logic device(s) 102A, 102B, 102C, 102D, 102E by allowing the power input 104 to provide the auxiliary power 110 to the polled logic device(s) 102A, 102B, 102C, 102D, 102E. The logic controller 106 may listen for a request signal, such as an assertion for auxiliary power, from the polled logic device(s) 102A, 102B, 102C, 102D, 102E. The request signal may, for example, be sent from the logic device(s) 102A, 102B, 102C, 102D, 102E to the logic controller 106 using the respective dedicated request pin(s) 118A, 118B, 118C, 118D, 118E, such as by sending a low signal through the respective dedicated request pin(s) 118A, 118B, 118C, 118D, 118E. If the logic controller 106 receives a request signal from the polled logic device(s) 102A, 102B, 102C, 102D, 102E, the logic controller 106 may continue to allow the power input 104 to provide the auxiliary power 110 to the polled logic device(s) 102A, 102B, 102C, 102D, 102E. If the logic controller 106 receives a no-request signal from the polled logic device(s) 102A, 102B, 102C, 102D, 102E (e.g., using the dedicated request pin(s) 118A, 118B, 118C, 118D, 118E), or if a timer expires without the logic controller 106 receiving the request signal from the polled logic device(s) 102A, 102B, 102C, 102D, 102E, the logic controller 106 may cease to allow the power input 104 to provide the auxiliary power 110 to the polled logic device(s) 102A, 102B, 102C, 102D, 102E and poll another logic device(s) 102A, 102B, 102C, 102D, 102E.

According to another example implementation, the logic controller 106 may poll the logic device(s) 102A, 102B, 102C, 102D, 102E a second time in response to a timeout or the timer expiring before polling another logic device(s) 102A, 102B, 102C, 102D, 102E. The logic controller 106 may thereby provide the auxiliary power 110 to only a first logic device(s) 102A, 102B, 102C, 102D, 102E which asserts the request for auxiliary power, according to an example implementation.

In an example implementation, the auxiliary power 110 may be sufficient to power more logic devices 102A, 102B, 102C, 102D, 102E than the logic controller 106 polls at one time. For example, the logic controller 106 may poll one logic device 102A, 102B, 102C, 102D, 102E at a time, but the auxiliary power 110 may be sufficient to power two logic devices 102A, 102B, 102C, 102D, 102E. In this example, the logic controller 106 may, in response to receiving a first asserted request for auxiliary power from a logic device 102A (which may or may not be the first logic device 102A to be polled), the logic controller 102A may continue to allow the power input 104 to provide the auxiliary power 110 to the logic device 102A which first asserted the request for auxiliary power, and may continue to poll subsequent logic devices 102B, 102C, 102D, 102E until receiving a number of asserted requests for auxiliary power equal to the number of logic devices 102A, 102B, 102C, 102D, 102E which the auxiliary power 110 is sufficient to power.

In other examples, the logic controller 106 may poll any number of logic devices 102A, 102B, 102C, 102D, 102E at a time, said number being less than the total number of logic devices 102A, 102B, 102C, 102D, 102E, until receiving a predetermined number of asserted requests for auxiliary power; the predetermined number may be based on the number of logic devices 102A, 102B, 102C, 102D, 102E which the auxiliary power 110 is sufficient to power.

The logic devices 102A, 102B, 102C, 102D, 102E may send a request signal or non-request signal to the logic controller 106 based on information stored in the memory components 116A, 116B, 116C, 116D, 116E, such as based on devices connected to the logic devices 102A, 102B, 102C, 102D, 102E or processes to be performed by the logic devices 102A, 102B, 102C, 102D, 102E. The logic devices 102A, 102B, 102C, 102D, 102E may, for example, read the memory components 116A, 116B, 116C, 116D, 116E upon being provided the auxiliary power 110. In an example implementation, the logic devices 102A, 102B, 102C, 102D, 102E may not be able to read their respective memory components 116A, 116B, 116C, 116D, 116E until being provided with the auxiliary power 110.

According to an example implementation, the logic controller 106 may allow the power input 104 to provide the auxiliary power 110 to the polled logic device(s) 102A, 102B, 102C, 102D, 102E by enabling their corresponding enabling node(s) 114A, 114B, 114C, 114D, 114E. The logic controller 106 may continue to allow the power input 104 to provide the auxiliary power to the polled logic device(s) 102A, 102B, 102C, 102D, 102E by leaving the corresponding enabling node(s) 114A, 114B, 114C, 114D, 114E in an enabled state. The logic controller 106 may cease to allow the power input 104 to provide the auxiliary power 110 to the polled logic device(s) 102A, 102B, 102C, 102D, 102E by disabling the corresponding enabling node(s) 114A, 114B, 114C, 114D, 114E, according to an example implementation.

The logic devices 102A, 102B, 102C, 102D, 102E may support the WoL process in an "out of the box" fashion. For example, the logic devices 102A, 102B, 102C, 102D, 102E may support the WoL process based on information stored in their respective memory components 116A, 116B, 116C, 116D, 116E. When the system 100 is powered by auxiliary power 100, the system, including the logic devices 102A, 102B, 102C, 102D, 102E, may receive a wakeup packet (not shown), which may be an out of the box Ethernet packet, from the external system 120. This logic devices 102A, 102B, 102C, 102D, 102E may receive the wakeup packet from the external system 120 through, for example, the Ethernet. However, when the system is powered by the auxiliary power 110, only the logic device(s) 102A, 102B, 102C, 102D, 102E which asserted the request(s) for auxiliary power, and/or which is allowed by the logic controller 106 to use the auxiliary power 110, may be able to process the wakeup packet.

In response to receiving the wakeup packet, the logic device(s) 102A, 102B, 102C, 102D, 102E may engage in the "wake-on LAN" (WoL) process, perform management functions, and/or may interact with the external system 120 using auxiliary power-based system functions. The logic device(s) 102A, 102B, 102C, 102D, 102E which are powered by the auxiliary power 110 and able to process the wakeup packet may also "wake" the system 100 and turn the other logic devices 102A, 102B, 102C, 102D, 102E on, such as by instructing the power input 104 to switch from auxiliary power 110 to main power 108. Switching from auxiliary power 110 to main power 108 may provide sufficient power for all the logic devices 102A, 102B, 102C, 102D, 102E to power on with full functionality. Thus, the system 100 may turn on in response to a wakeup packet rather than in response to a user pressing the "on" button.

In another example implementation, the system 100 may transition from auxiliary power 110 to main power 108. This may occur, for example, in response to the system 100 being "turned on," such as by a user pressing the "on" button, or in response to the system 100 receiving a wakeup packet, as described above. When the main power 108 becomes available, the power input 104 may switch to the main power 104. In response to switching to main power 108, the system 100 may make the main power 108 available to all the logic devices 102A, 102B, 102C, 102D, 102E. For example, the logic controller 106 may activate all the enabling nodes 114A, 114B, 114C, 114D, 114E, allowing the power input 104 to provide the main power 108 to all the logic devices 102A, 102B, 102C, 102D, 102E. Or, the logic devices 102A, 102B, 102C, 102D, 102E may receive the main power 108 through main power inputs 122A, 122B, 122C, 122D, 122E, which may include switches and may be activated when the system 100 is turned on.

With all of the logic devices 102A, 102B, 102C, 102D, 102E receiving main power 108, all of the logic devices 102A, 102B, 102C, 102D, 102E may operate with full functionality, and may wake the entire system 100 to full functionality. During operation, a software driver for the logic devices 102A, 102B, 102C, 102D, 102E running under an operating system may change the configuration of the logic devices 102A, 102B, 102C, 102D, 102E. For example, the software driver and/or operating system may configure one or more new packets to be detected, such as a packet indicating a power down.

With all of the logic devices 102A, 102B, 102C, 102D, 102E powered on using main power 108, the operating system may also reconfigure the logic devices 102A, 102B, 102C, 102D, 102E. For example, the operating system may override the wakening (which occurred in response to receiving the wakeup packet), and return the system 100 to using auxiliary power 110 instead of main power 108. The operating system may also reconfigure the logic devices 102A, 102B, 102C, 102D, 102E so that a different logic device 102A, 102B, 102C, 102D, 102E asserts the request for auxiliary power and becomes powered on by the logic controller 106 using auxiliary power 110. Or, the operating system may reconfigured the logic devices 102A, 102B, 102C, 102D, 102E to not respond to the wakeup packet, or to not assert requests for auxiliary power.

In another example, the system 100 may transition from using the main power 108 to using the auxiliary power 110. For example, the system 100 may shut down or restart. The main power 108 may power down or drop, and the power input 104 may switch from main power 108 to auxiliary power 110. The power input 104 may, for example, switch to auxiliary power 110 in response to the main power 108 falling below a threshold. The auxiliary power 110 may not be sufficient to power all of the logic devices 102A, 102B, 102C, 102D, 102E.

In one example of the system 100 transitioning from main power 108 to auxiliary power 110, the system 100 may notify the logic devices 102A, 102B, 102C, 102D, 102E before transitioning, such as by using the operating system to notify the logic devices 102A, 102B, 102C, 102D, 102E of the transition. In this example, the logic devices 102A, 102B, 102C, 102D, 102E may, in response to the notification, indicate to the logic controller 106, before the transition from main power 108 to auxiliary power 110, whether the respective logic devices 102A, 102B, 102C, 102D, 102E need the auxiliary power 110. The logic devices 102A, 102B, 102C, 102D, 102E send a single auxiliary power request signal, or may hold the request auxiliary power signal for as long as they are powered by either auxiliary power 110 or main power 108. The system 100 and/or logic controller 106 may have determined, based on the indication(s) from the logic devices 102A, 102B, 102C, 102D, 102E, which logic devices 102A, 102B, 102C, 102D, 102E need the auxiliary power 110 before transitioning from the main power 108 to the auxiliary power 110.

In one such example, such as when a user turns the system 100 off by providing an instruction to software such as the operating system, the software may send an early power down indication, such as a reset indication, to the logic devices 102A, 102B, 102C, 102D, 102E, and may remove the software driver from the logic devices 102A, 102B, 102C, 102D, 102E. In response to receiving the early power down indication, the logic devices 102A, 102B, 102C, 102D, 102E may enter a lower power state and may decide whether to assert a request for the auxiliary power 110 during the power down. The logic devices 102A, 102B, 102C, 102D, 102E may make either positive or negative assertions, or may assert different priority levels for remaining powered on. For example, assertions or priority levels of the logic devices 102A, 102B, 102C, 102D, 102E may be based on processes performed by the logic devices 102A, 102B, 102C, 102D, 102E, or based on information stored in the volatile memory (not shown) of the logic devices 102A, 102B, 102C, 102D, 102E which has not been transferred to non-volatile memory such as the memory components 116A, 116B, 116C, 116D, 116E.

In this example of the system 100 transitioning from main power 108 to auxiliary power 110, the logic controller 106 may select a group of the logic devices 102A, 102B, 102C, 102D, 102E for enabling and/or disabling based on the assertions or the asserted priority levels. The size of the groups may be predetermined, or may be based on dividing the power available from auxiliary power 110 by a threshold or minimum power requirement for the logic devices 102A, 102B, 102C, 102D, 102E. Upon transitioning from main power 108 to auxiliary power 110, the logic controller 106 may disable the auxiliary power 110 to a selected group of logic devices 102A, 102B, 102C, 102D, 102E to allow sufficient power for the remaining logic devices 102A, 102B, 102C, 102D, 102E to remain powered on, or may enable auxiliary power 110 to only a selected group of logic devices 102A, 102B, 102C, 102D, 102E to allow sufficient power for the selected group of logic devices 102A, 102B, 102C, 102D, 102E to remain on.

In another example, the system 100 may transition from main power 108 to no power, and then to auxiliary power 110. For example, the system 100 may power down without providing any notice of powering down to the logic devices 102A, 102B, 102C, 102D, 102E. This may be caused by a sudden primary power removal may occur, requiring an unexpected power down. In this example, all of the logic devices 102A, 102B, 102C, 102D, 102E may have power removed for a period of time until the auxiliary power 110 becomes available, creating a "power gap." In this example, the logic devices 102A, 102B, 102C, 102D, 102E may all turn off due to the lack of power.

After the power gap, when the auxiliary power 110 becomes available, the logic controller 106 may then determine which logic devices 102A, 102B, 102C, 102D, 102E should receive the auxiliary power 110. For example, the logic controller 106 may thereafter poll the logic devices 102A, 102B, 102C, 102D, 102E to determine which logic devices 102A, 102B, 102C, 102D, 102E should perform functions under auxiliary power 110. The logic controller 106 may, for example, poll the logic devices 102A, 102B, 102C, 102D, 102E by providing the auxiliary power 110 as described in the example of transitioning from no power to auxiliary power 110. The logic controller 106 may provide the auxiliary power 110 to the logic device(s) 102A, 102B, 102C, 102D, 102E based on the polling.

Figure 2:
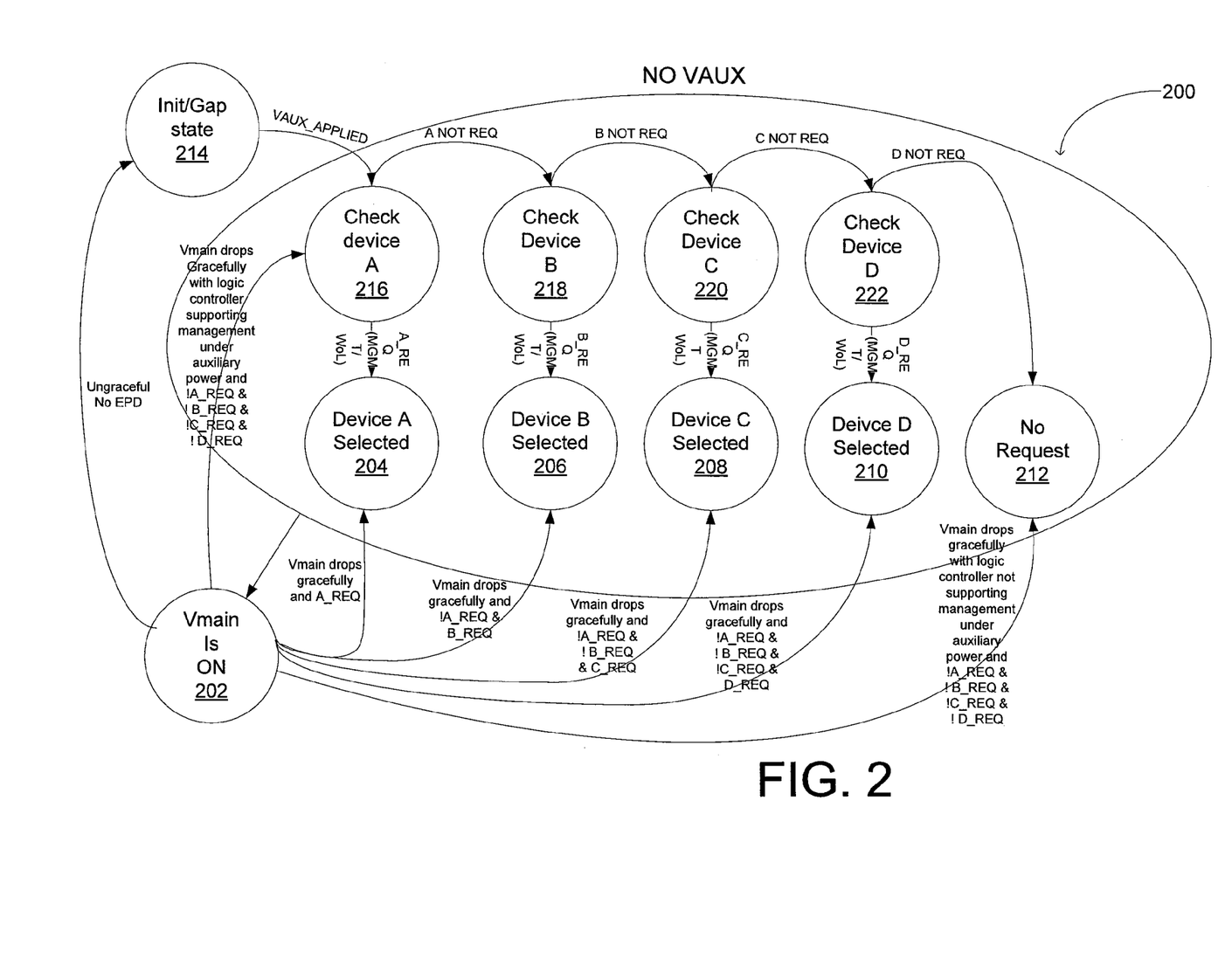
FIG. 2 is a state machine diagram showing logical states for the logic controller, according to an example implementation.

FIG. 2 is a state machine diagram 200 showing logical states for the logic controller 106, according to an example implementation. In an example implementation, a process may begin with the main power 108 on (202). In a 'graceful' power down, in which an early power down indication is sent to the logic devices 102A, 102B, 102C, 102D, 102E and the power input 104 switches to auxiliary power 110 before shutting down, the logic devices 102A, 102B, 102C, 102D (only four logic devices are shown in this example) may assert a request for auxiliary power 110. Upon transition from main power 108 to auxiliary power 110, the logic controller 106 may grant auxiliary power 110 to the logic devices 102A, 102B, 102C, 102D which asserted requests for auxiliary power (204, 206, 208, 210), or which asserted the highest priority requests for auxiliary power 110. If no logic device 102A, 102B, 102C, 102D asserts a request, then the logic controller 106 may poll the logic devices 102A, 102B, 102C, 102D in case any of the logic devices 102A, 102B, 102C, 102D were not able to assert their request in time. The logic controller 106 may also poll the logic devices 102A, 102B, 102C, 102D after a power gap, such as after a power down without an early power indication, or upon powering on, as described below.

In an example in which the system 100 begins with no power available (214) and then powers on with auxiliary power 110 becoming available first, the logic controller 106 may poll the logic devices 102A, 102B, 102C, 102D to determine whether they require auxiliary power 110 (216, 218, 220, 222). The logic controller 106 may grant auxiliary power 110 to the first logic device 102A, 102B, 102C, 102D which requests auxiliary power 110 (204, 206, 208, 210). If none of the logic devices 102A, 102B, 102C, 102D assert a request for auxiliary power 110, then auxiliary power 110 may not be provided to any of the logic devices 102A, 102B, 102C, 102D (212).

In another example, the logic controller 106 may be configured to determine whether the system 100 is supporting management under auxiliary power 110. For example, the operating system may determine whether the logic devices 102A, 102B, 102C, 102D should engage in the WoL process. In the event of a graceful power down, the logic controller may be configured to be aware whether the system 100 is supporting management under auxiliary power 110. The support of the WoL process may be determined, for example, by the operating system. If the system 100 is supporting management under auxiliary power 110, then in the event of a graceful power down from main power 108 being on (202), the logic controller 106 may poll the logic devices 102A, 102B, 102C, 102D to determine whether they require auxiliary power 110 (216, 218, 220, 222). If the system 100 is not supporting management under auxiliary power 110, then in the event of a graceful power down from main power 108 being on (202), the logic controller 106 may not poll the logic devices 102A, 102B, 102C, 102D, and no power may be provided to the logic devices 102A, 102B, 102C, 102D (212).

Figure 3:
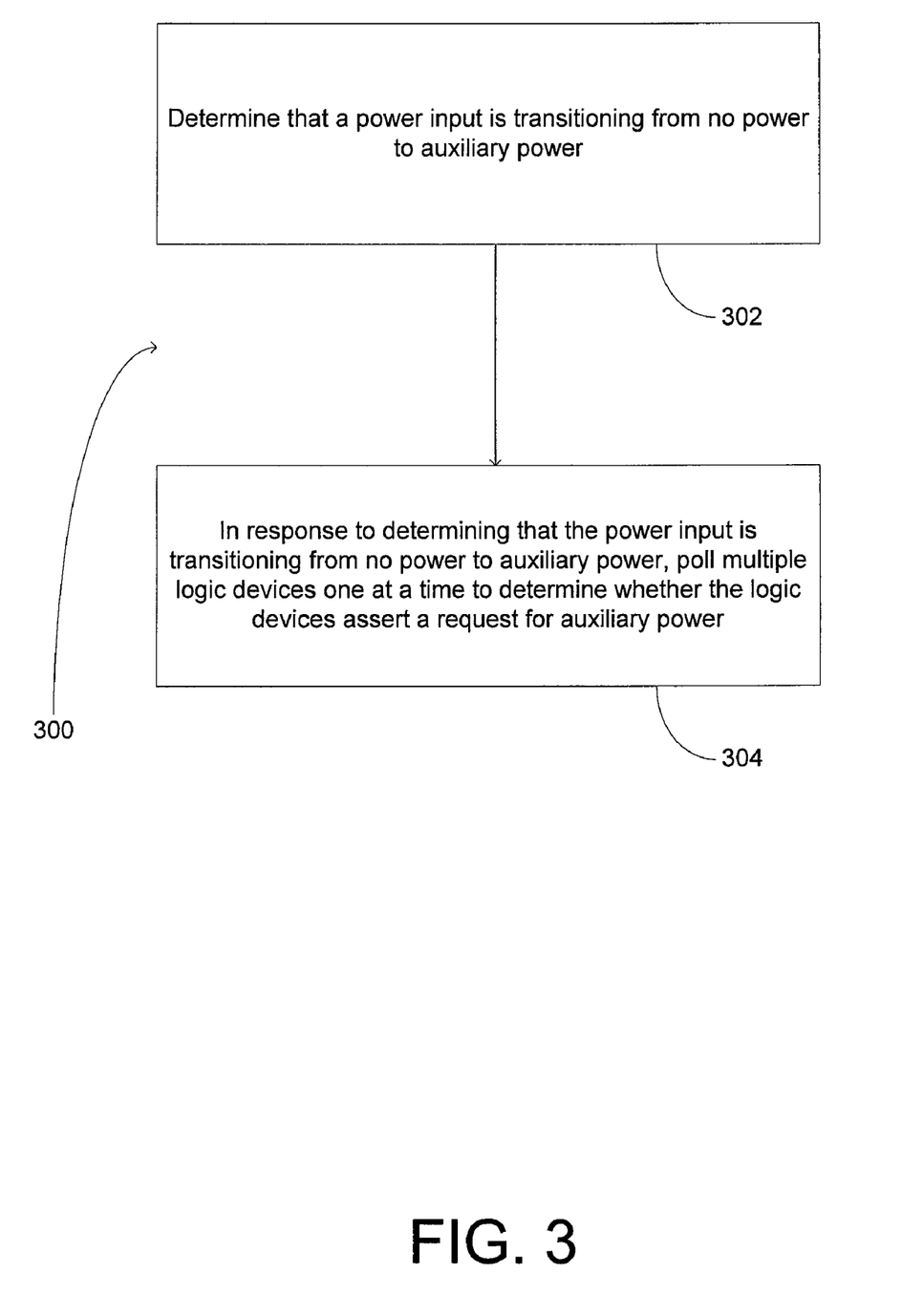
FIG. 3 is a flowchart showing a process according to an example implementation.

FIG. 3 is a flowchart showing a process 300 for controlling auxiliary power to logic devices according to an example implementation. In this example, the process 300 may include determining that a power input 104 is transitioning from no power to auxiliary power 110 (302). The process 300 may further include, in response to determining that the power input 104 is transitioning from no power to auxiliary power 110, polling multiple logic devices 102A, 102B, 102C, 102D, 102E one at a time to determine whether the logic devices 102A, 102B, 102C, 102D, 102E assert a request for auxiliary power (304). Polling the multiple logic devices 102A, 102B, 102C, 102D, 102E (304) may include, for example, enabling a power input 104 to provide the auxiliary power 110 to a first polled logic device 102A, and continuing to allow the power input 104 to provide the auxiliary power 110 to the first polled logic device 102A in response to receiving the request from the first polled logic device 102A. Polling the multiple logic devices 102A, 102B, 102C, 102D, 102E (304) may also include, for example, disabling the power input 104 from providing the auxiliary power 110 to the first polled logic device 102A, and polling a second logic device 102B in response to either receiving a no-request signal from the first polled logic device 102A or a timer expiring without receiving the request from the first polled logic device 102A.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the implementations of the invention.

What is claimed is:

1. A system comprising:
multiple logic devices, each of the logic devices being configured to assert a request for auxiliary power to a logic controller;
a power input configured to provide the auxiliary power to the logic devices, the auxiliary power being insufficient to provide power to all of the logic devices; and
a logic controller configured to poll the logic devices by:
allowing the power input to provide the auxiliary power to less then all of the logic devices at a time; and
if the polled logic devices do not assert the request for auxiliary power while the auxiliary power is provided, cease allowing the power input to provide the auxiliary power to the polled logic devices which did not assert the request.

2. The system of claim 1 wherein the power input is configured to provide main power to all of the logic devices instead of the auxiliary power in response to main power becoming available to the power input, the main power being sufficient to provide power to all of the logic devices.

3. The system of claim 1 wherein the logic controller is configured to continue to allow the power input to provide the auxiliary power to a first logic device which asserts the request for the auxiliary power while polling other logic devices.

4. The system of claim 1 wherein the logic devices are configured to instruct the power input to switch from the auxiliary power to a main power in response to the logic devices receiving a wakeup packet while the logic devices are powered by the auxiliary power.

5. The system of claim 1 wherein the logic controller is configured to poll the logic devices by polling less then all of the logic devices at a time to determine whether the logic devices assert the request for the auxiliary power by:
enabling the power input to provide the auxiliary power to a first polled logic device;
continuing to allow the power input to provide the auxiliary power to the first polled logic device in response to receiving the request signal from the first polled logic device; and
disabling the power input from providing the auxiliary power to the first polled logic device, and polling a second logic device, in response to either receiving a no-request signal from the first polled logic device or a timer expiring without receiving the request from the first polled logic device.

6. The system of claim 1 wherein the logic controller is configured to poll the logic devices a second time in response to a timeout occurring after a first polling.

7. The system of claim 1 further comprising:
multiple enabling nodes, each of the enabling nodes coupling the power input to one of the logic devices,
wherein the logic controller is configured to:
allow the power input to provide the auxiliary power to a first polled logic device by enabling the corresponding enabling node;
continue to allow the power input to provide the auxiliary power to the first polled logic device by leaving the corresponding enabling node in an enabled state; and
disabling the power input from providing the auxiliary power to the first polled logic device by disabling the corresponding enabling node.

8. The system of claim 1 wherein the logic controller is configured to:
determine a number of the logic devices for which the auxiliary power is able to provide a threshold power level; and
poll the less than all of the logic devices at a time by polling the logic devices in groups based on the determined number of logic devices.

9. The system of claim 1 wherein the logic controller is configured to poll the logic devices according to a predetermined sequence.

10. The system of claim 1 further comprising:
multiple dedicated request pins, each dedicated request pin coupling one of the logic devices to the logic controller,
wherein each of the logic devices is configured to assert the request for auxiliary power using its dedicated request pin, and
wherein the logic controller is configured to poll the logic devices using dedicated request pins.

11. The system of claim 1 wherein each of the logic devices is configured to assert the request for auxiliary power in response to the power input transitioning from no power to the auxiliary power.

12. The system of claim 1, wherein the power input is configured to provide, to the logic devices, main power sufficient to power all of the logic devices and, when the main power is unavailable, the auxiliary power, the auxiliary power being insufficient to provide power to all of the logic devices.

13. A logic controller comprising:
multiple pins configured to receive requests for auxiliary power from multiple logic devices, the auxiliary power being insufficient to provide power to all of the logic devices; and
a logic circuit configured to poll the multiple logic devices by:
enabling the auxiliary power to less than all of the logic devices at a time; and
if the polled logic devices do not assert requests for auxiliary power while the auxiliary power is enabled, disabling the auxiliary power to the polled logic devices which did not assert the requests.

14. The logic controller of claim 13, wherein the logic circuit is further configured to instruct the power input to switch from providing a main power to the logic devices to providing the auxiliary power to the logic devices based on the main power falling below a threshold.

15. The logic controller of claim 13, wherein the logic circuit is configured to continue to enable the auxiliary power to a first logic device which asserts the request for the auxiliary power while polling other logic devices.

16. The logic controller of claim 13, wherein the logic circuit is configured to poll the logic devices by polling less then all of the logic devices at a time to determine whether the logic devices assert the request for the auxiliary power by:
enabling the auxiliary power to a first polled logic device;
continuing to enable the auxiliary power to the first polled logic device in response to receiving the request signal from the first polled logic device; and
disabling the auxiliary power to the first polled logic device, and polling a second logic device, in response to either receiving a no-request signal from the first polled logic device or a timer expiring without receiving the request from the first polled logic device.

17. The logic controller of claim 13, wherein the logic circuit is configured to poll the logic devices a second time in response to a timeout occurring after a first polling.

18. The logic controller of claim 13, wherein the logic circuit is configured to:

determine a number of the logic devices for which the auxiliary power is able to provide a threshold power level; and poll the less than all of the logic devices at a time by polling the logic devices in groups based on the determined number of logic devices.

19. The logic controller of claim 13, wherein the logic circuit is configured to poll the logic devices according to a predetermined sequence.

* * * * *

UNITED STATES PATENT AND TRADEMARK OFFICE
CERTIFICATE OF CORRECTION

| | | |
|---|---|---|
| PATENT NO. | : 8,166,330 B2 | Page 1 of 1 |
| APPLICATION NO. | : 11/951759 | |
| DATED | : April 24, 2012 | |
| INVENTOR(S) | : Arik Pickholz et al. | |

It is certified that error appears in the above-identified patent and that said Letters Patent is hereby corrected as shown below:

In column 11, line 11, in claim 1, delete "less then" and insert -- less than --, therefor.

In column 11, line 34, in claim 5, delete "less then" and insert -- less than --, therefor.

In column 12, line 51-52, in claim 16, delete "less then" and insert -- less than --, therefor.

Signed and Sealed this
Twenty-sixth Day of June, 2012

David J. Kappos
*Director of the United States Patent and Trademark Office*